US 8,042,723 B2

United States Patent
Holi

(10) Patent No.: US 8,042,723 B2
(45) Date of Patent: Oct. 25, 2011

(54) METHOD OF REPAIR

(75) Inventor: Shuji Holi, Takasago (JP)

(73) Assignee: Mitsubishi Heavy Industries, Ltd (JP)

( * ) Notice: Subject to any disclaimer, the term of this patent is extended or adjusted under 35 U.S.C. 154(b) by 0 days.

(21) Appl. No.: 12/528,259

(22) PCT Filed: Oct. 6, 2008

(86) PCT No.: PCT/JP2008/068180
§ 371 (c)(1),
(2), (4) Date: Oct. 2, 2009

(87) PCT Pub. No.: WO2009/051031
PCT Pub. Date: Apr. 23, 2009

(65) Prior Publication Data
US 2010/0187290 A1   Jul. 29, 2010

(30) Foreign Application Priority Data

Oct. 15, 2007   (JP) .............................. 2007-267666

(51) Int. Cl.
*B23K 1/00*   (2006.01)
*B23K 1/19*   (2006.01)
(52) U.S. Cl. ................. 228/141.1; 228/159; 228/160; 228/161; 228/165
(58) Field of Classification Search ............... 228/141.1, 228/159, 160, 161, 165
See application file for complete search history.

(56) References Cited

U.S. PATENT DOCUMENTS 3,031,996 A * 5/1962 Botvin ................. 428/605
4,285,459 A * 8/1981 Baladjanian et al. ....... 228/119

(Continued)

FOREIGN PATENT DOCUMENTS

JP   8127833   5/1996

(Continued)

OTHER PUBLICATIONS

Office Action Mar. 29, 2011 from corresponding Korean Application No. 10-2009-7016028 along with English Translation.

*Primary Examiner* — Kiley Stoner
*Assistant Examiner* — Erin Saad
(74) *Attorney, Agent, or Firm* — Kanesaka Berner and Partners, LLP

(57) ABSTRACT

Provided is a method of repair which method is capable of holding a molten brazing material at the bonding portion when a component is bonded with a brazing material to an inclined or to a curved surface. The method of repair repairs by brazing a repair portion in which a crack has developed and which needs repair, wherein a brazing material support (4) holding in the interior thereof a molten brazing material (5) is brought into contact with the repair portion, and under the condition that the brazing material support (4) is in contact with the repair portion, the molten brazing material (5) is solidified. Under the condition that the brazing material (5) in a powder form is brought into contact with the brazing material support (4), the brazing material (5) can be melted by heating to a temperature at or above the melting point of the brazing material (5). Alternatively, under the condition that the brazing material support (4) in the interior of which the brazing material (5) has been beforehand held is brought into contact with the repair portion, the brazing material (5) can be melted by heating to a temperature at or above the melting point of the brazing material (5).

12 Claims, 13 Drawing Sheets

U.S. PATENT DOCUMENTS

| | | | |
|---|---|---|---|
| 2003/0082048 A1* | 5/2003 | Jackson et al. | 415/115 |
| 2007/0039177 A1* | 2/2007 | Yoshioka et al. | 29/889.1 |

FOREIGN PATENT DOCUMENTS

| | | |
|---|---|---|
| JP | 9168927 | 6/1997 |
| JP | 11033832 | 2/1999 |
| JP | 11043706 | 2/1999 |
| JP | 3982630 | 8/2004 |
| JP | 2004-283886 | 10/2004 |
| JP | 2005254283 | 9/2005 |
| JP | 2005305492 | 11/2005 |
| JP | 2006046147 | 2/2006 |
| JP | 2006188760 | 7/2006 |
| JP | 2007224414 | 9/2007 |

* cited by examiner

METHOD OF REPAIR

CROSS-REFERENCE TO RELATED APPLICATIONS

The present Application is based on International Application No. PCT/JP2008/068180, filed on Oct. 6, 2008, which in turn corresponds to Japanese Application No. 2007-267666, filed on Oct. 15, 2007, and priority is hereby claimed under 35 USC §119 based on these applications. Each of these applications are hereby incorporated by reference in their entirety into the present application.

TECHNICAL FIELD

The present invention relates to a method of repair suitable for repairing the damaged defective portion by brazing when a machine component is damaged.

BACKGROUND ART

For example, a stator vane, which is one of the components of a gas turbine, is exposed to the highest temperature combustion gas in a gas turbine. Accordingly, in the stator vane, inevitably develop damages such as cracks due to thermal fatigue, as a main factor, ascribable to the thermal stress at the time of start and stop. The stator vane also suffers damages due to other factors including creep damage and fatigue damage in addition to thermal fatigue.

Conventionally, when such damages develop, the damaged portions are repaired, for example, by the TIG welding and the stator vane is continuously used. Here, due to the thermal effect exerted by welding at the time of repairing and for the purpose of removing the residual stress, a deformation is caused in the stator vane. On the other hand, as the elevation of operational temperature of a gas turbine is promoted, the repair work load has been increased. Accordingly, it comes to be not easy to eliminate or minimize the deformation occurring in the stator vane. Such a deformation occurs in other machines as well as in gas turbines.

Proposals for solving these problems have been presented in Patent Documents 1 to 3.

The proposals of Patent Documents 1 to 3 are common in that a mixture composed of a powder (base material powder) of the same materials as the base of the component to be repaired and a brazing material powder is filled in the portion where the damage has developed. For example, in Patent Document 3, as shown in FIGS. 11A to 11C, the oxide layer of the surface portion of the base 70 of a stator vane of a gas turbine, which portion suffers cracks 71 developing therein, is scraped away in such a way that the cracks 71 partially remain unremoved; in the scraped portion, an equivalent-to-base material 72 (blank circles) composed of a material equivalent to the base 70 of the stator vane and a brazing material 73 (solid black circles) lower in melting point than the equivalent-to-base material 72 are filled; then, heat treatment is conducted while pressurizing with an inert gas, and thus the brazing material 73 is melted to perform the brazing of the cracks 71 by diffusion.

Patent Document 1: Japanese Patent Laid-Open No. 11-33832
Patent Document 2: Japanese Patent Laid-Open No. 11-43706
Patent Document 3: Japanese Patent Laid-Open No. 2006-46147

DISCLOSURE OF THE INVENTION

Problems to be Solved by the Invention

However, the proposals of Patent Documents 1 to 3 end up with imperfect repair when the portion to be repaired is inclined or extends over a curved surface. In other words, in the case where the portion to be repaired is inclined, the molten brazing material 73 flows out from the recess, which is the repair portion, as shown in FIG. 12. With the outflow of the brazing material 73, the base material powder can also flow out from the recess. Alternatively, in the case where the portion to be repaired extends over a curved surface, the brazing material 81 moves, when melted, to the lower portion of the curved surface (symbol 82), as shown in FIG. 13. With the movement of the brazing material 81 (82), the base material powder (not shown) also moves, and consequently the upper ends of the both sides of the curved surface are not brazed. As described above, when the portion to be repaired is inclined or is a curved surface, the repair can be imperfect.

The present invention has been accomplished in view of such technical problems, and has an object to provide a method of repair which method is capable of holding a molten brazing material at the bonding portion when a component is brazed to an inclined portion or to a curved surface.

Means for Solving the Problems

According to conventional methods, when the repair portion is inclined, the brazing material in a molten state flows out along the inclination from the portion which needs the brazing material for repair. For the purpose of preventing such outflow, the present inventor has conceived an idea that the brazing material in molten state is held, for example, in a brazing material support made of a porous material. In other words, the porous material is brought into contact with the repair portion of the base, the brazing material is heated for melting under such a condition, and thus the brazing material is impregnated into the porous material. The pores of the porous material are communicatively connected to each other in the interior of the porous material. The brazing material impregnated into the interior of the porous material also penetrates into the interstice between the base and the porous material and is used to braze together the base and the porous material. Additionally, the brazing material impregnated into the interior of the porous material also penetrates into the cracks formed in the base and enables the cracks to be filled with the brazing material.

The present invention is based on the above-described idea, and is a method of repair which repairs by brazing a repair portion of a base, the portion needing repair, wherein a brazing material support holding in the interior thereof a molten brazing material is brought into contact with the repair portion, and under the condition that the brazing material support is in contact with the repair portion, the molten brazing material is solidified.

As the brazing material support in the interior of which a molten brazing material is held, the present invention includes at least two aspects. In one aspect, the brazing material is melted by heating to a temperature at or above the melting point of the brazing material under the condition that the brazing material in a powder form is brought into contact with the brazing material support. The molten brazing material penetrates into the interior of the brazing material support to be held therein. In the other aspect, the brazing material is melted by heating to a temperature at or above the melting point of the brazing material under the condition that the brazing material support in the interior of which the brazing material has been beforehand held is brought into contact with the repair portion.

As the brazing material support in the present invention, usable is a porous material having a three-dimensional network structure in which the pores of the porous material are communicatively connected to each other.

As the porous material, usable is a porous material having flexibility; even when the repair portion is a curved surface, it is easy to place the brazing material support along the curved surface.

In the present invention, after the brazing material has been solidified, the brazing material support may be left as it is to constitute a portion of the base. In this case, the brazing material support may be made of a material equivalent to the base material.

In the present invention, a portion of the base is removed, and the brazing material support may be placed at the portion of the base which portion has been subjected to the removal.

In other words, by removing a portion of the base in which portion a crack has developed, the crack having developed is sealed with the brazing material and additionally, the area including the surrounding of the crack may also be repaired.

In the present invention, the molten brazing material is solidified under the condition that an exchange component to be exchanged with the removed portion of the base is brought into contact with the brazing material support, and thus, the base and the exchange component may also be bonded to each other through the brazing material support.

ADVANTAGE OF THE INVENTION

According to the present invention, brazing is conducted by using a brazing material support, and consequently, even when the portion to be brazed is inclined or a curved surface, the outflow of the molten brazing material from the portion to be brazed can be prevented.

DESCRIPTION OF SYMBOLS 1, 10, 30, 40, 50, 60, 70 . . . Base; 2, 11, 71 . . . Crack; 3 . . . Removal portion; 4, 12, 32, 44, 52 . . . Brazing material support; 5, 13, 33, 45, 64, 73, 81, 82 . . . Brazing material; 41 . . . Main body; 42 . . . Protrusion; 43, 63 . . . Groove, 51, 62 . . . Exchange component; 72 . . . Equivalent-to-base material

BEST MODE FOR CARRYING OUT THE INVENTION

Hereinafter, the present invention is described in detail on the basis of the embodiments illustrated in the accompanying drawings.

First Embodiment

Figure 1A:
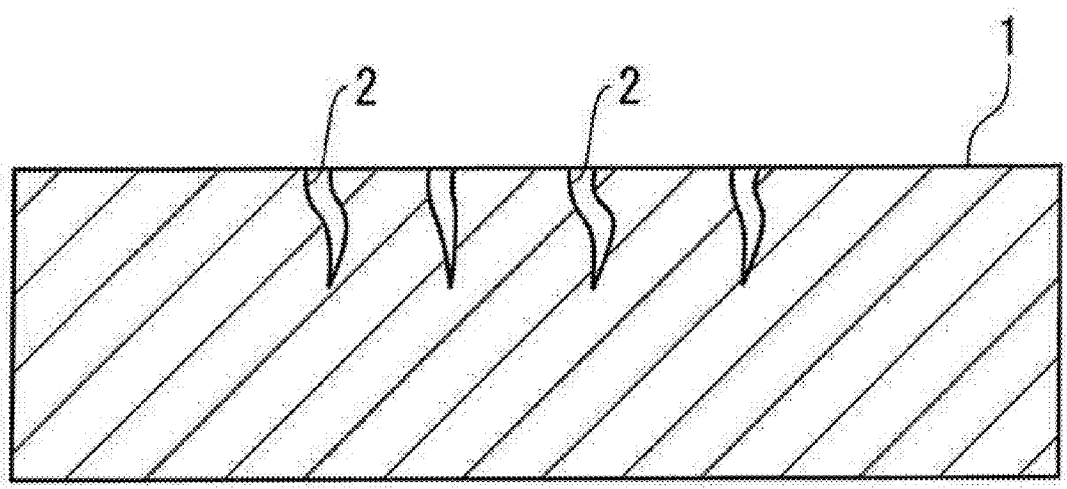
FIGS. 1A and 1B are views illustrating the method of repair according to a first embodiment of the present invention, wherein a process of removing a cracked portion is illustrated.

FIGS. 1A to 3B are the views illustrating the procedures of the method of repair according to a first embodiment. As shown in FIG. 1A, the first embodiment is a method for repairing a base 1 in which cracks 2 have developed. Examples of the base 1 include a stator vane of a gas turbine; at the time of the periodic inspection of a gas turbine, the method of repair according to the present embodiment is implemented. However, the base 1 is not limited to this; the base widely includes the components in which damages such as cracks 2 have developed.

Figure 1B:
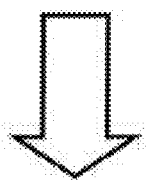
Figure 1B:
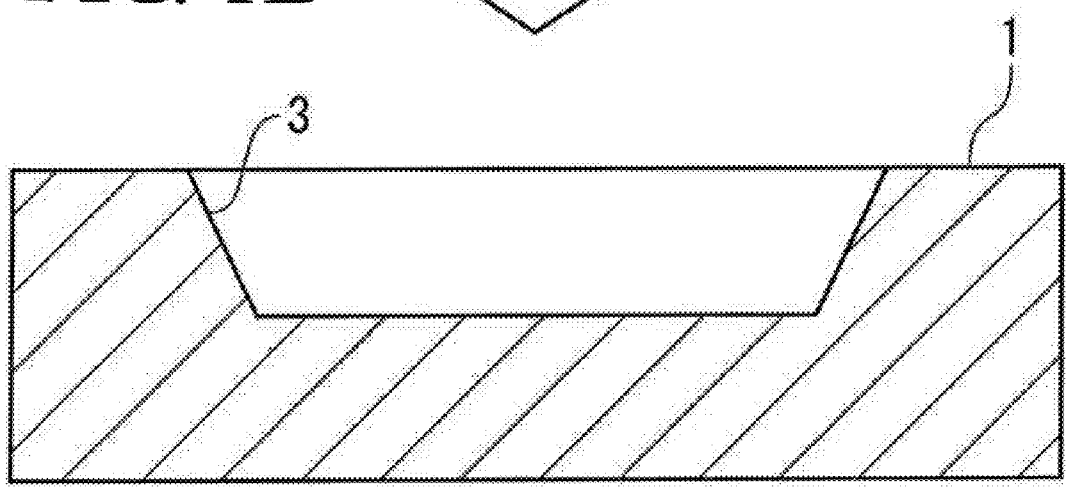

As shown in FIG. 1B, the portion of the base 1 containing the cracks 2 is scraped away to form a removal portion 3. Additionally, the oxide layer formed on the base 1 is removed by this scraping. The removal portion 3 is formed in a shape permitting placing therein a brazing material support 4 to be described later.

In the first embodiment, the base 1 is scraped so as for the cracks 2 to completely disappear; however, the base 1 may be scraped so as for the cusps of the cracks 2 to partially remain.

Figure 2A:
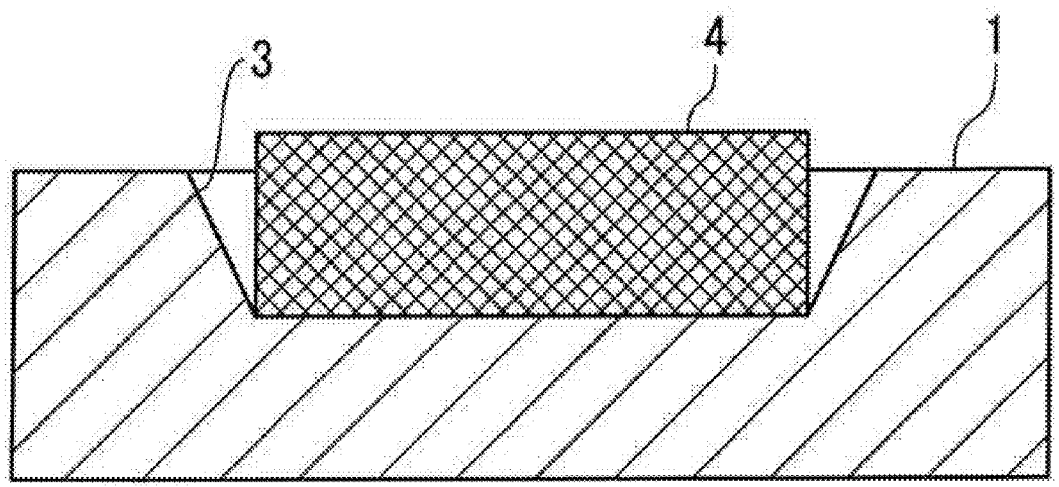
FIGS. 2A and 2B are views illustrating the method of repair according to the first embodiment of the present invention, wherein a process of placing a brazing material support and a brazing material is illustrated.

Next, as shown in FIG. 2A, the brazing material support 4 is placed in the removal portion 3. The placement of the brazing material support 4 may be such that the brazing material support 4 is simply placed at the bottom of the removal portion 3, or such that the brazing material support 4 is fixed to the removal portion 3 by point welding or the like.

The brazing material support 4 is made of a porous metal material. The porous metal material has a three-dimensional network structure in which the pores of the porous metal material are communicatively connected to each other. In the brazing material support 4, the pores on the surface thereof are communicatively connected to the outside. As a porous metal material, there are some porous metal materials having a closed pore structure in which the pores thereof are mutually partitioned. However, in such a porous metal material having a closed pore structure, it is difficult to sufficiently impregnate the molten brazing material. Accordingly, in the present embodiment, a porous metal material having a three-dimensional network structure in which the pores of the porous metal material are communicatively connected to each other is used as the brazing material support 4. On the bottom of the removal portion 3, the oxide layer has been removed, and hence the base 1 and the brazing material support 4 directly contact with each other through the metals contained in the base 1 and the support 4.

A porous metal material can be produced, for example, by sintering a metal powder. A sintered metal has a feature that the pore size can be made approximately as small as 1 μm, but the porosity thereof is as low as at most approximately 50%. In the present embodiment, it is preferable that the porosity be high, for the purpose of holding a predetermined amount of the molten brazing material in the interior of the porous metal material. Accordingly, the present embodiment uses a porous metal material having a three-dimensional network structure in which the pores of the porous metal material are communicatively connected to each other. In such a porous metal material, the pores of approximately 10 to 1000 μm in pore size can be formed with a porosity of at most approximately 97%. By controlling the pore size and the porosity, the mechanical strength of such a porous metal material can be controlled. In the present embodiment, after the completion of the repair, the brazing material support 4 constitutes a portion of the base 1, and hence it is necessary to select the pore size and the porosity by considering such a situation in addition to the holding of the brazing material.

The brazing material support 4 is made of a material equivalent to the base 1. In the stator vane of a gas turbine, a Co-base heat-resistant alloy has been used from the viewpoints of welding workability and thermal fatigue property; however, for the stator vanes of gas turbines increased in operational temperature and in size, Ni-base heat-resistant alloys come to be developed and used. When a Co-base heat-resistant alloy is used as the base 1 in the present embodiment, the brazing material support 4 is preferably made of a Co-base heat-resistant alloy equivalent to the base 1. Alternatively, when a Ni-base heat-resistant alloy is used as the base 1 in the present embodiment, the brazing material support 4 is preferably made of a Ni-base heat-resistant alloy equivalent to the base 1.

It is efficient to obtain the brazing material support 4 by cutting out from a base material prepared separately. This is because the size of the removal portion 3 is not specified.

The present applicant has proposed in Patent Document 4 a Ni-base heat-resistant alloy suitable for the stator vanes of gas turbines increased in operational temperature and in size. This Ni-base heat-resistant alloy (trade name: MGA2400) contains, in terms of the percentage by weight, 0.05 to 0.25% C, 18 to 25% Cr, 15 to 25% Co, one or two of 3.5% or less Mo and 5 to 10% W wherein the content of W+½Mo is 5 to 10%, 1.0 to 5.0% Ti, 1.0 to 4.0% Al, 0.5 to 4.5% Ta, 0.2 to 3.0% Nb, 0.005 to 0.10% Zr and 0.001 to 0.01% B, the balance comprising Ni and the inevitable impurities, wherein the alloy has a composition falling in a range enclosed by the lines connecting the following points sequentially in a coordinate system wherein the x-axis represents the (Al+Ti) amount and the y-axis represents the (W+½Mo) amount: the point A (Al+Ti: 3%, W+½Mo: 10%), the point B (Al+Ti: 5%, W+½Mo: 7.5%), the point C (Al+Ti: 5%, W+½Mo: 5%), the point D (Al+Ti: 7%, W+½Mo: 5%) and the point E (Al+Ti: 7%, W+½Mo: 10%). Accordingly, when the base 1 is a stator vane of a gas turbine, both the base 1 and the brazing material support 4 may be the alloys having the compositions falling within the above-described range. In other words, the above described term "equivalent" is not limited to the case where the chemical compositions are absolutely identical to each other.

Patent Document 4: Japanese Patent Laid-Open No. 8-127833

Figure 2B:
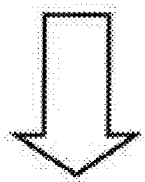
Figure 2B:
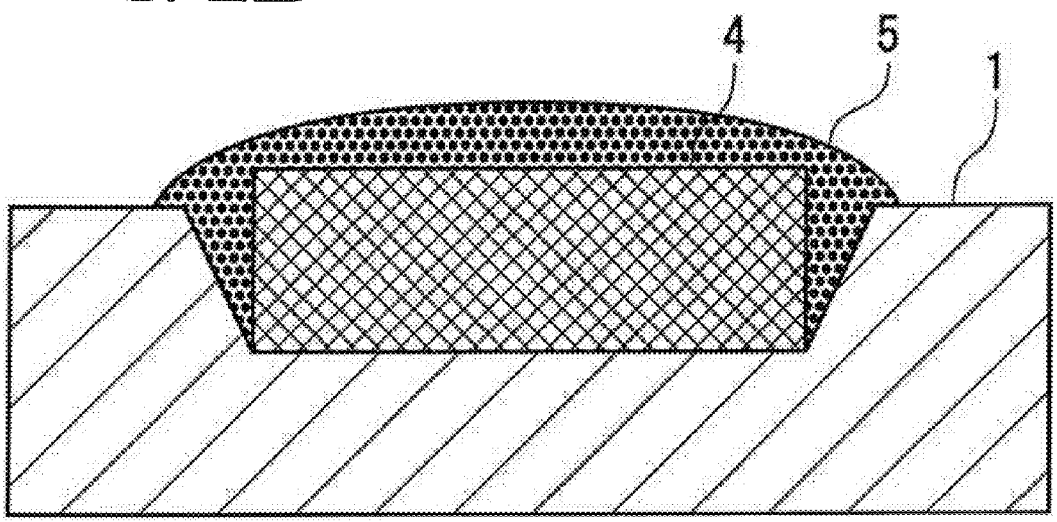

Next, as shown in FIG. 2B, the brazing material support 4 and a portion of the base 1 are covered with a brazing material 5 in a powder form. The brazing material 5 comprises an alloy lower in melting point than the base 1 and the brazing material support 4. For example, the brazing material 5 can be obtained by adding a predetermined amount of one or two of B and Si, which are melting point-lowering elements, to the alloys constituting the brazing material support 4 and the base 1. It is not easy to handle the brazing material 5 as a single powdery substance, and hence the brazing material 5 preferably takes a paste form as a mixture with a liquid.

After the brazing material support 4 and a portion of the base 1 have been covered with the brazing material 5, the base 1 is moved into a not-shown heating furnace, and the brazing treatment is conducted. As the heating furnace, a vacuum heating furnace or an inert-gas furnace capable of making available an atmosphere of an inert gas is used; this is for the purpose of preventing the oxidation of the base 1 and the like.

Figure 3A:
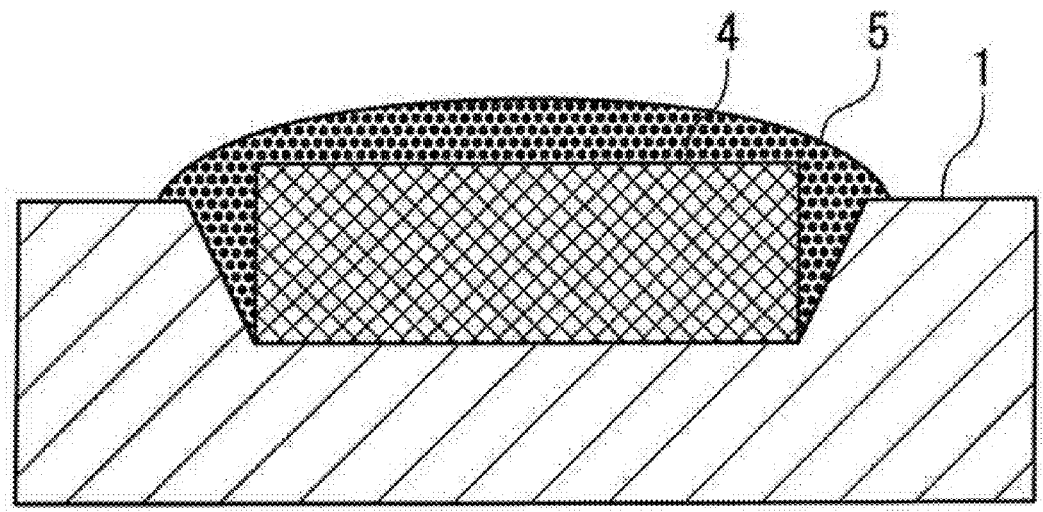
FIGS. 3A and 3B are views illustrating the method of repair according to the first embodiment of the present invention, wherein a process of removing an excessive brazing material support and an excessive brazing material is illustrated.

When the brazing material 5 covering the brazing material support 4 and a portion of the base 1 is heated to a temperature at or above the melting point thereof, the brazing material 5 is melted (FIG. 3A). The molten brazing material 5 penetrates into the pores formed in the brazing material support 4 to be impregnated into the brazing material support 4. In this case, it is understood that a capillary phenomenon takes place between the pores of the brazing material support 4 and the brazing material 5. Since the brazing material 5 has been impregnated into the brazing material support 4, even when the base 1 is inclined, there is almost no possibility that the brazing material 5 flows out from the brazing material support 4 to the outside. The use of a vacuum heating furnace facilitates the impregnation of the brazing material 5 into the brazing material support 4.

In FIG. 3A, the excessive brazing material 5 not impregnated into the brazing material support 4 is shown; however, the excessive brazing material 5 is interconnected with the brazing material 5 impregnated into the brazing material support 4, and hence, even when the base 1 is inclined, the excessive brazing material 5 is hardly separated away from the brazing material support 4. Additionally, by appropriately setting the initial amount of the brazing material 5, the amount of the excessive brazing material 5 can be reduced or made to disappear.

In the course of the brazing treatment, the brazing material 5 is impregnated into the brazing material support 4, and additionally, a part of the brazing material 5 penetrates into the interstice between the bottom surface of the brazing material support 4 and the base 1 and into the interstice between the side surfaces of the brazing material support 4 and the base 1. This brazing material 5 penetrates into the concerned places by passing through the pores in the brazing material support 4 or by moving down the side surfaces of the brazing material support 4. This brazing material 5 contributes to the bonding between the base 1 and the brazing material support 4.

After heating for a predetermined time, the heating inside the heating furnace is terminated and the temperature inside the furnace is decreased down to normal temperature. In the course of the temperature decrease, element diffusion occurs between the brazing material 5 and the brazing material support 4 and between the brazing material 5 and the base 1, and thus, the brazing material support 4 is strongly bonded to the base 1. The pores of the brazing material support 4 made of a porous metal material are filled with the brazing material 5 to increase the mechanical strength of the brazing material support 4.

Figure 3B:
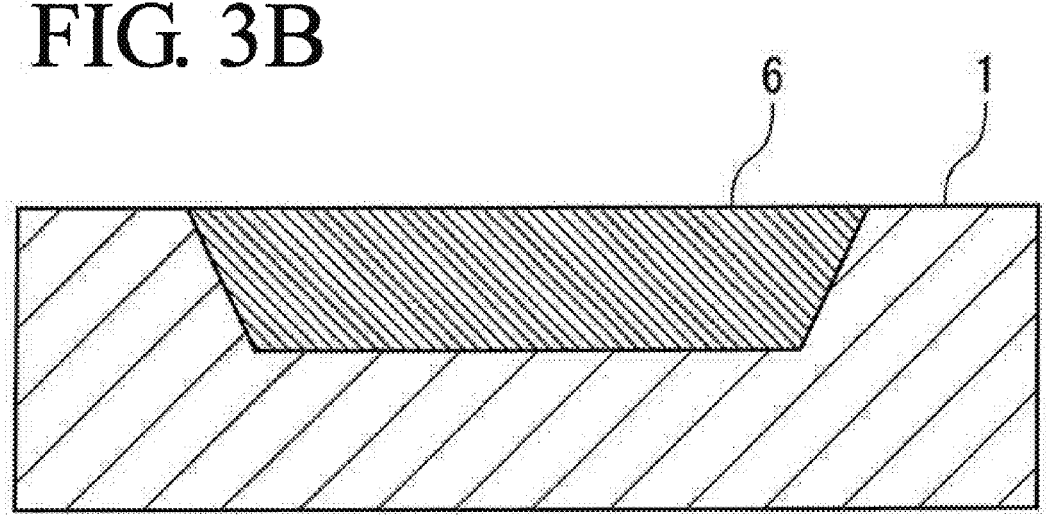

After the brazing material 5 has been solidified, as shown in FIG. 3B, the brazing material support 4 protruding from the base 1 and the excessive brazing material 5 are removed. The brazing material support 4 which is impregnated with the brazing material 5 and bonded to the base 1 is left on the base 1 as it is, so as to constitute the repair portion 6 of the base 1.

As described above, according to the present embodiment, since the molten brazing material 5 is impregnated into the interior of the brazing material support 4, even when the base 1 is placed with an inclination, the brazing material 5 does not flow out to the surroundings.

Additionally, according to the present embodiment, since the brazing material support 4 is made of a material equivalent to the base 1, the brazing material support 4 has a function of holding the molten brazing material 5 therein, and also functions after brazing as the repair portion 6 constituting a portion of the base 1.

Additionally, according to the present embodiment, in the case where the removal portion 3 is formed by scraping the base 1, the brazing material support 4 having a size corresponding to the removal portion 3 can be prepared by cutting out from a base material, and hence the work efficiency is satisfactory.

It is to be noted that in the above-described example, in the course of the brazing treatment, the brazing material 5 in a powder form is heated and melted to be impregnated into the brazing material support 4, but alternatively, the brazing material 5 may be beforehand impregnated into the brazing material support 4. In this case, by immersing the brazing material support 4 in the molten brazing material 5, the brazing material 5 can be impregnated into the brazing material support 4.

Second Embodiment

Next, with reference to FIG. 4, a second embodiment according to the present invention is described.

Figure 4A:
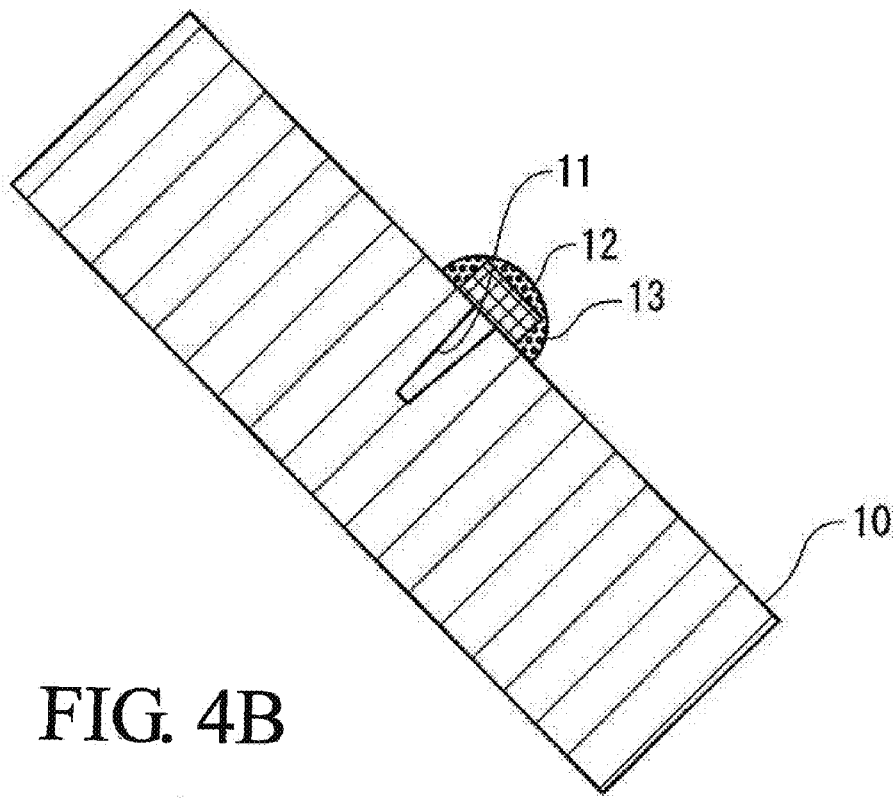
FIGS. 4A and 4B are views illustrating the method of repair according to a second embodiment of the present invention, wherein a process of impregnating a brazing material into a brazing material support by applying heat treatment is illustrated.

As shown in FIG. 4A, a crack 11 is assumed to develop in an inclined base 10.

A brazing material support 12 is placed on the base 10 so as to seal the opening of the crack 11. In this case, for the purpose of preventing the brazing material support 12 from moving downward, the brazing material support 12 is preferably fixed to the base 10 by point welding or the like. After the brazing material support 12 has been placed, the brazing material support 12 and a portion of the base 10 are covered with a brazing material 13 in a powder form. The brazing material support 12 and the brazing material 13 may be the same as the brazing material support 4 and the brazing material 5 of the first embodiment, respectively.

Figure 4B:
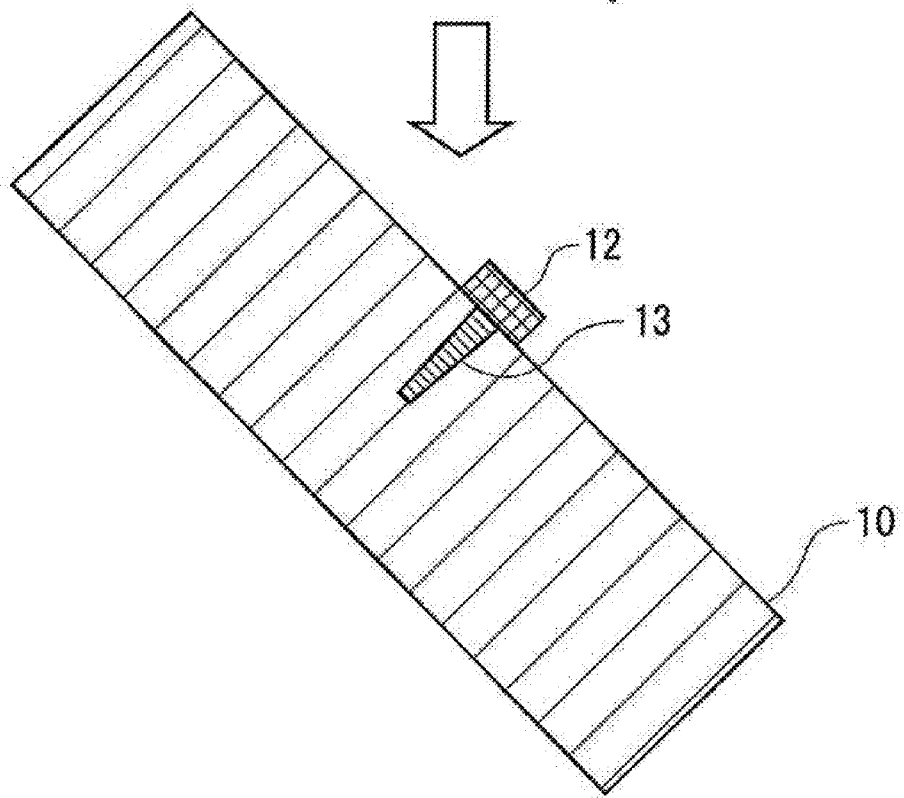

After the brazing material support 12 and a portion of the base 10 have been covered with the brazing material 13, the brazing treatment is conducted in the same manner as in the first embodiment. The brazing material 13 is melted by heat treatment, and impregnated into the pores of the brazing material support 12. The molten brazing material 13 is also filled in the interstice between the brazing material support 12 and the base 10, and a part of the filled brazing material 13 passes through the pores in the interior of the brazing material support 12 and penetrates into the interior of the crack 11 to be filled therein (FIG. 4B).

In the above-described process, since the brazing material 13 is impregnated into the brazing material support 12, even when the base 10 is inclined, there is almost no possibility that the brazing material 13 flows out to the outside from the brazing material support 12, in the same manner as in the first embodiment.

After the brazing material 13 has been solidified, the brazing material support 12 is removed. Thus, the crack 11 is filled with the brazing material 13 to complete the repair.

Additionally, the present invention includes a mode in which the brazing material support 12 is not utilized as a portion of the base 10, as in the present embodiment.

Third Embodiment

Next, with reference to FIGS. 5A to 6B, a third embodiment according to the present invention is described.

Figure 5A:
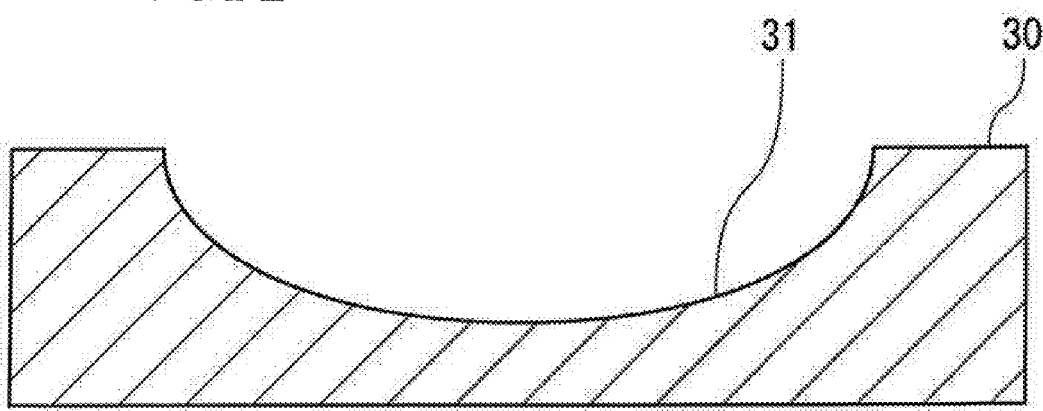
FIGS. 5A and 5B are views illustrating the method of repair according to a third embodiment of the present invention, wherein a process of placing a brazing material support is illustrated.
Figure 5A:
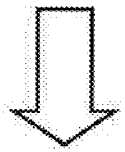

As shown in FIG. 5A, a recess 31 is formed in the central portion of a base 30. The surface (cross section) of the recess 31 forms a circular arc surface (curved surface). In the third embodiment, overlaying is applied to the surface of the recess 31. It is to be noted that in FIGS. 5A, 5B and 6A, 6B, depiction of the cracks is omitted.

Figure 5B:
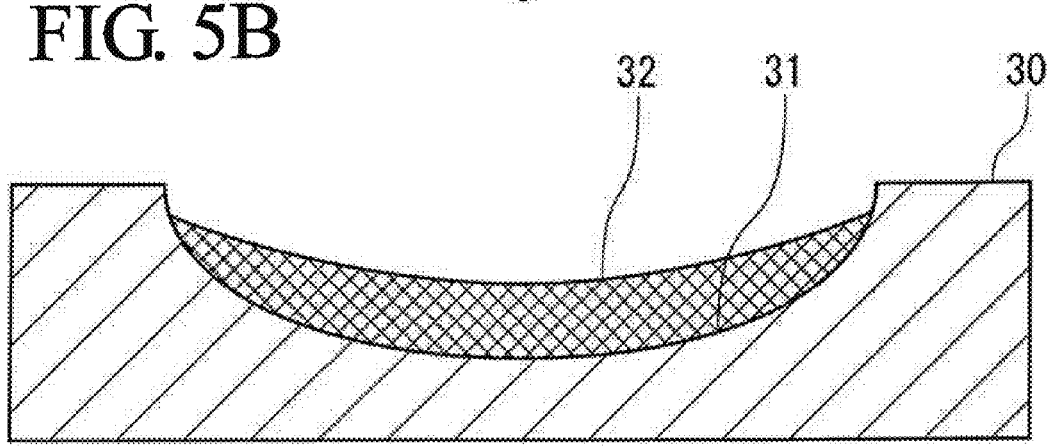

As shown in FIG. 5B, a brazing material support 32 is placed on the surface of the recess 31. In the third embodiment, as the brazing material support 32, a porous metal material having flexibility is used. When the shape of the surface of the recess 31 is known, a brazing material support 32 in conformity with the shape can be prepared. However, when the recess 31 is formed by scraping according to the development conditions of the cracks, the shape of the recess 31 is variable. Accordingly, by preparing the brazing material support 32 using a porous metal material having flexibility, the brazing material support 32 can be placed, without forming any interstice, on the surface of the recess 31.

Typical examples of the porous metal material having flexibility include metal wool, metal nonwoven fabric and metal gauze; any of these corresponds to a metal porous material provided with continuous pores and can function as the brazing material support 32 of the present invention. The metal nonwoven fabric and metal gauze can be made to function as the brazing material support 32 by laminating these thin materials.

Figure 6A:
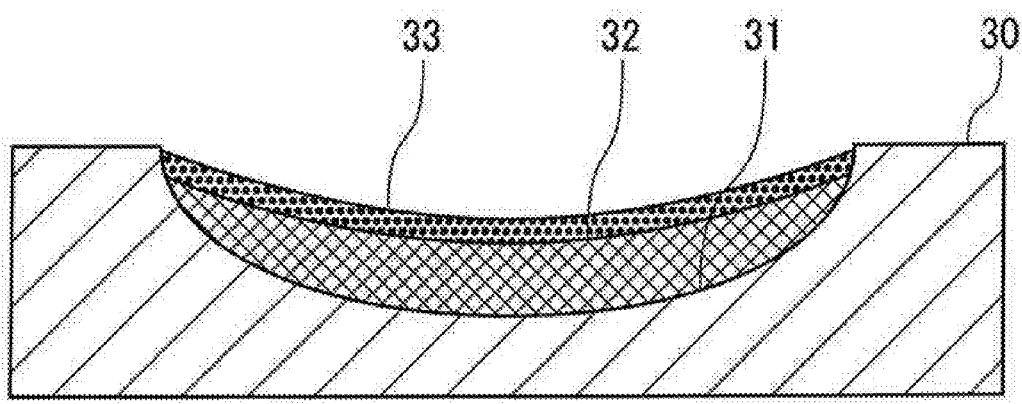
FIGS. 6A and 6B are views illustrating the method of repair according to the third embodiment of the present invention, wherein a process of removing an excessive brazing material support and an excessive brazing material is illustrated.
Figure 6A:
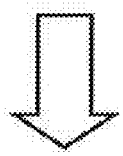
Figure 6B:
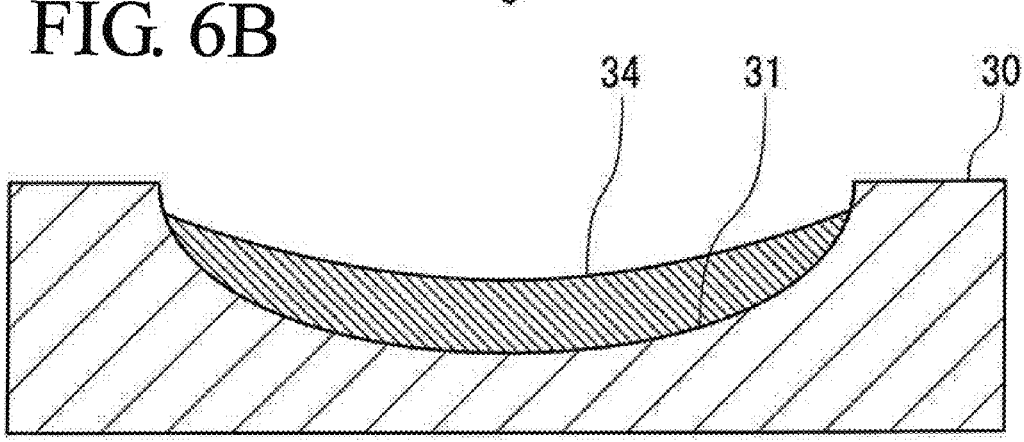

After the brazing material support 32 has been placed, a brazing material 33 is placed so as to cover the brazing material support 32, as shown in FIG. 6A. The brazing material 33 is a material prepared by converting a powder into a paste form in the same manner as in the first embodiment and is placed along the surface of the brazing material support 32.

After the brazing material 33 has been placed on the brazing material support 32, the brazing material 33 is melted by heat treatment and is impregnated into the pores of the brazing material support 32 in the same manner as in the first embodiment. The molten brazing material 33 also penetrates into the interstice between the brazing material support 32 and the base 30 to be filled therein. In this process, the brazing material 33, other than the brazing material 33 which has also penetrated into the interstice between the brazing material support 32 and the base 30 to be filled therein, is impregnated into the brazing material support 32, and hence does not gather in the widthwise central portion of the recess 31.

Accordingly, the molten brazing material 33 can be filled over the whole boundary between the brazing material support 32 and the base 30. The brazing material 33 contributes to the bonding between the base 30 and the brazing material support 32.

After heating for a predetermined time, the heating inside the heating furnace is terminated and the temperature inside the furnace is decreased down to normal temperature. In the course of the temperature decrease, element diffusion occurs between the brazing material 33 and the brazing material support 32, and thus, the brazing material support 32 is strongly bonded to the base 30. The pores of the brazing material support 32 made of a porous metal material are filled with the brazing material 33. Hence the brazing material support 32 is converted into an overlaid layer 34 formed by filling the pores of the brazing material support 32 with the brazing material 33 to increase the mechanical strength of the overlaid layer 34. In the present embodiment, the overlaid layer 34 is left as it is to constitute a portion of the base 30. In this connection, needless to say, the overlaid layer 34 can be processed into an optional shape.

As described above, the third embodiment repairs a curved surface, wherein the brazing material support 32 is made of a porous metal material, and hence the brazing material 33 can be impregnated into the brazing material support 32. Consequently, the brazing material 33 can be filled over the whole areas of the places, needing the brazing material 33, between the brazing material support 32 and the base 30.

Additionally, in the third embodiment, as the brazing material support 32, a porous metal material having flexibility is used, and hence even when the repair portion is a curved surface, the brazing material support 32 can be placed in the repair portion without leaving any interstice.

Fourth Embodiment

Next, with reference to FIGS. 7A to 8C, a fourth embodiment according to the present invention is described.

Figure 7A:
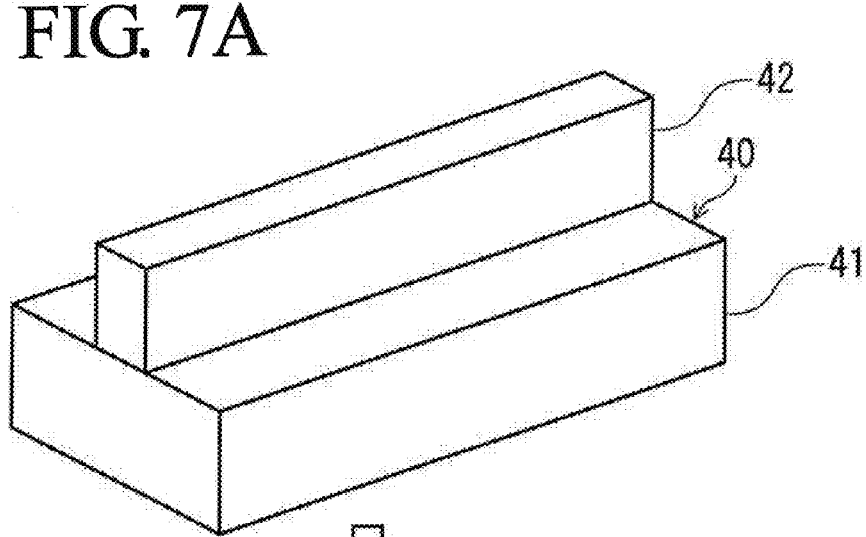
FIGS. 7A, 7B and 7C are views illustrating the method of repair according to a fourth embodiment of the present invention, wherein a process of removing a repair portion by scraping is illustrated.

The fourth embodiment repairs, as shown in FIG. 7A, a base 40 in which a protrusion 42 extending in the lengthwise direction is formed on the top surface of a rectangular parallelepiped main body 41.

Figure 7B:
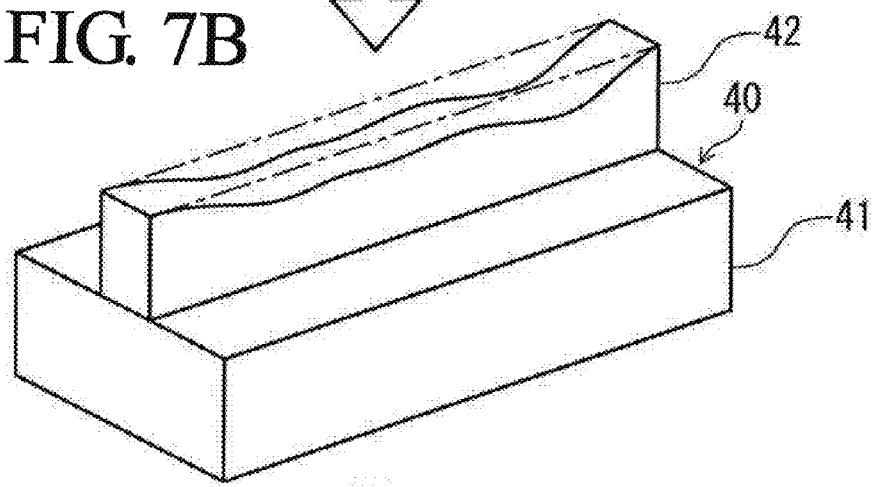
Figure 7C:
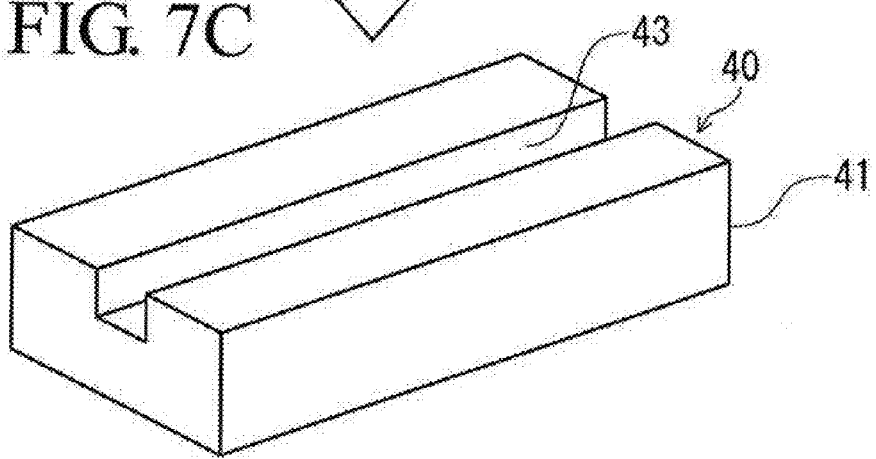

When the top surface of the protrusion 42 is abraded as shown in FIG. 7B, as a results of a long-term use of the base 40, it is necessary to repair the abraded portion. In the present embodiment, for example, the abraded portion is not repaired by overlaying, but the protrusion 42 is replaced. For that purpose, as shown in FIG. 7C, the portion of the main body 41 on which portion the protrusion 42 has been formed is scraped away to form a groove 43. The groove 43 has a width and a length allowing the insertion of a brazing material support 44 (FIG. 8A) having a width and a length equal to those of the protrusion 42.

Figure 8A:
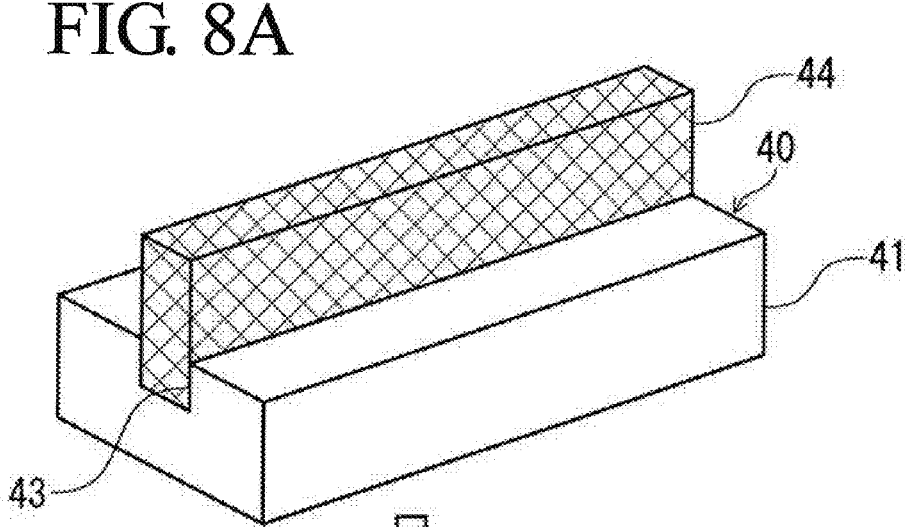
FIGS. 8A, 8B and 8C are views illustrating the method of repair according to the fourth embodiment of the present invention, wherein a process of removing an excessive brazing material is illustrated.

After the groove 43 has been formed, the brazing material support 44 is inserted into the groove 43 of the base 40, as shown in FIG. 8A. The brazing material support 44 is made of a porous metal material having a three-dimensional network structure in which the pores of the porous metal material are communicatively connected to each other, similarly to the brazing material support 4 of the first embodiment.

Figure 8B:
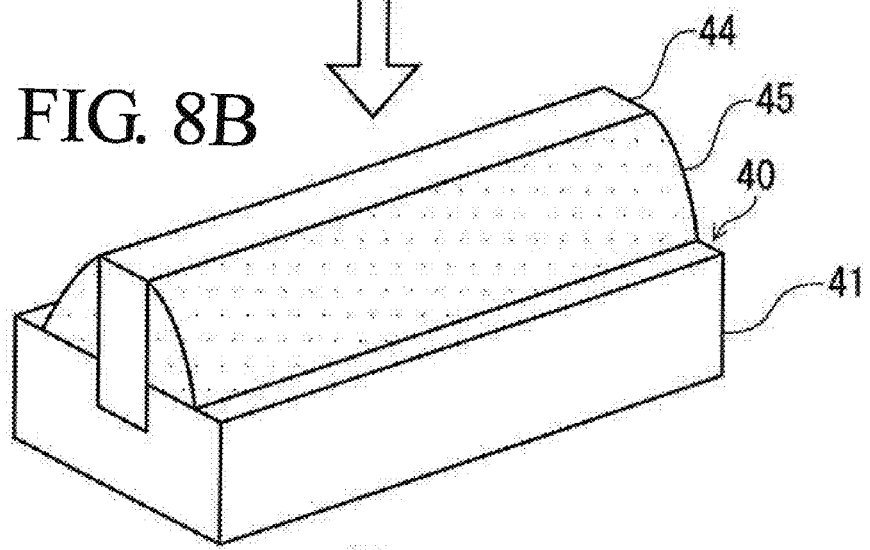
Figure 8C:
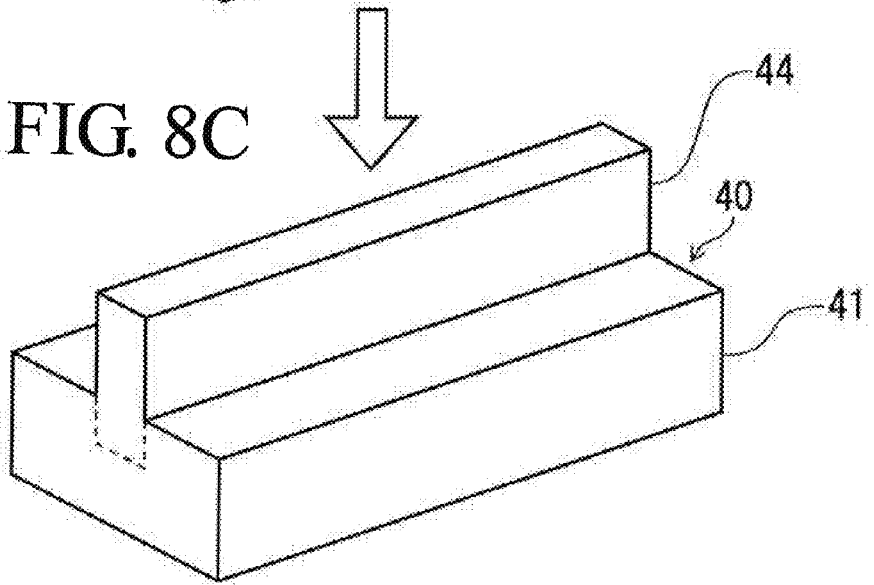

After the brazing material support 44 has been inserted into the groove 43, a brazing material 45 is placed on the main body 41 so as to be in contact with the sides of the brazing material support 44, as shown in FIG. 8B. The brazing material 45 is a material prepared by converting a powder into a paste form in the same manner as in the first embodiment.

After the brazing material 45 has been placed on the main body 41, the brazing material 45 is melted by heat treatment and is impregnated into the pores of the brazing material support 44 (FIG. 8C) in the same manner as in the first embodiment. A part of the molten brazing material 45 penetrates into the interstice between the brazing material support 44 in the groove 43 and the main body 41 to be filled therein. In this process, the brazing material 45, other than the brazing material 45 which has also penetrated into the interstice between the brazing material support 44 and the main body 41 to be filled therein, is impregnated into the brazing material support 44, and hence there is no possibility that the brazing material 45 flows out to the sides of the main body 41. Accordingly, the molten brazing material 45 can be filled over the whole boundaries between the brazing material support 44 and the main body 41. The brazing material 45 contributes to the bonding between the main body 41 and the brazing material support 44.

After heating for a predetermined time, the heating inside the heating furnace is terminated and the temperature inside the furnace is decreased down to normal temperature. In the course of the temperature decrease, element diffusion occurs between the brazing material 45 and the brazing material support 44 and between the brazing material 45 and main body 41, and thus, the brazing material support 44 is strongly bonded to the base 40. The pores of the brazing material support 44 made of a porous metal material are filled with the brazing material 45, and hence the brazing material support 44 is converted into a protrusion 42 formed by filling the pores of the brazing material support 44 with the brazing material 45 to increase the mechanical strength of the protrusion 42.

Fifth Embodiment

Next, with reference to FIG. 9, a fifth embodiment according to the present invention is described.

Figure 9A:
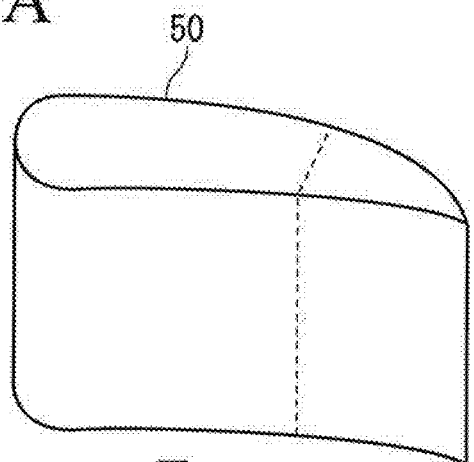
FIGS. 9A, 9B and 9C are views illustrating the method of repair according to a fifth embodiment of the present invention.

The fifth embodiment can be applied when a portion of a vane-shaped base 50 shown in FIG. 9A is remodeled and repaired into a different shape.

The portion on the posterior end side of the broken line on the base 50 shown in FIG. 9A is removed by cutting. It is to be noted that the portion thinner in thickness of the base 50 is referred to as the posterior portion and the portion thicker in thickness of the base 50 is referred to as the anterior portion.

Figure 9B:
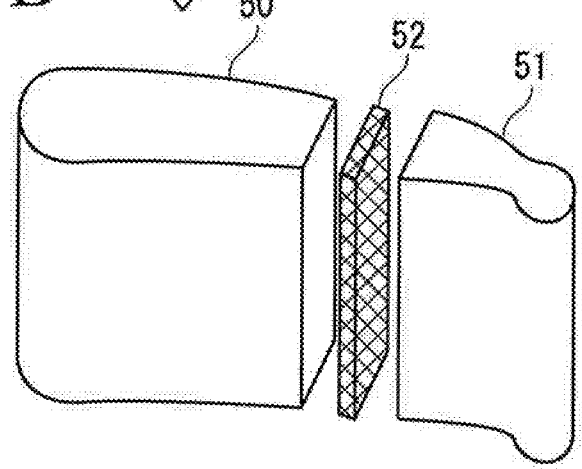

On the side where the posterior portion has been removed by cutting, as shown in FIG. 9B, an exchange component 51 having a bulgy posterior end is placed. The exchange component 51 is bonded to the base 50 with a brazing material support 52. The brazing material support 52 is made of the same porous metal material as shown in the first embodiment. However, in the brazing material support 52, the pores of the porous metal material have been beforehand impregnated with a brazing material. For the purpose of beforehand filling the brazing material, the porous metal material is immersed in the molten brazing material, and then taken out, and thereafter the brazing material is solidified; thus the brazing material support 52 can be prepared. In other words, this brazing material support 52 holds the brazing material beforehand.

Figure 9C:
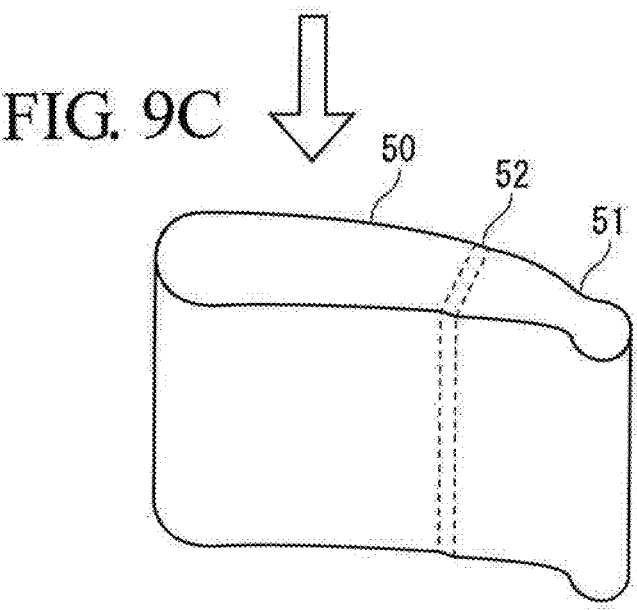

As shown in FIG. 9C, the brazing material support 52 is sandwiched with the base 50 and the exchange component 51. Under this condition, heat treatment is applied. The brazing material held by the brazing material support 52 is melted by the heat treatment. The molten brazing material penetrates into the interstice between the base 50 and the brazing material support 52 to be filled therein and the interstice between the exchange component 51 and the brazing material support 52 to be filled therein. In this process, the brazing material, other than the brazing material which has penetrated into the interstice between the base 50 and the brazing material support 52 to be filled therein and into the interstice between the exchange component 51 and the brazing material support 52 to be filled therein, is impregnated into the brazing material support 52, and hence there is no possibility that the brazing material flows out to the outside. The brazing material contributes to the bonding between the base 50 and the brazing material support 52 and the bonding between the exchange component 51 and the brazing material support 52.

After heating for a predetermined time, the heating inside the heating furnace is terminated and the temperature inside the furnace is decreased down to normal temperature. In the course of the temperature decrease, the base 50 and the exchange component 51 are strongly bonded to each other through the brazing material support 52. Thus, the base 50 having a new shape with a bulgy posterior end can be obtained.

Sixth Embodiment

Figure 10A:
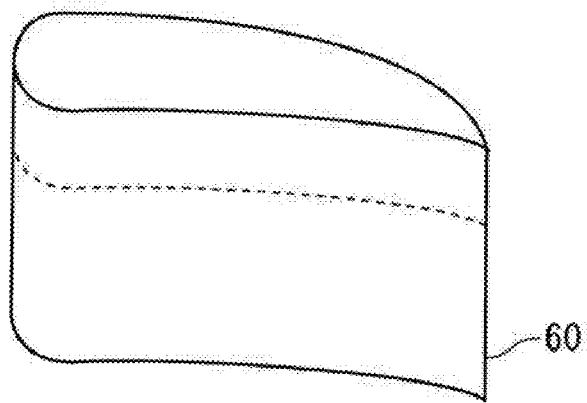
FIGS. 10A, 10B and 10C are views illustrating the method of repair according to a sixth embodiment of the present invention.
Figure 10B:
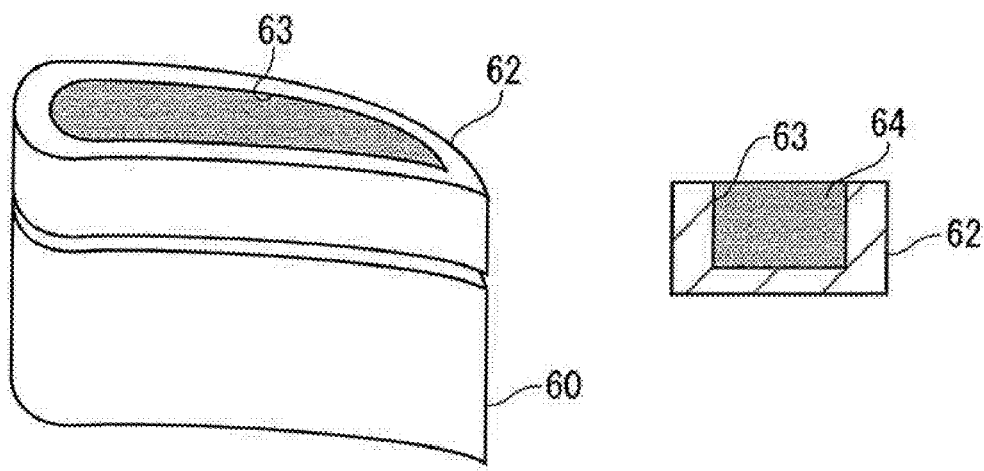
Figure 10C:
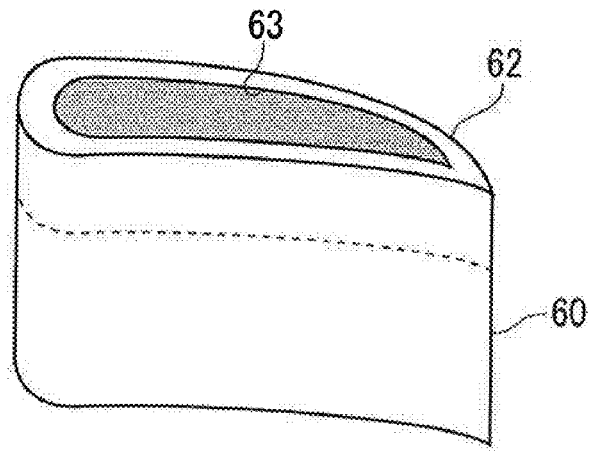
Figure 11A:
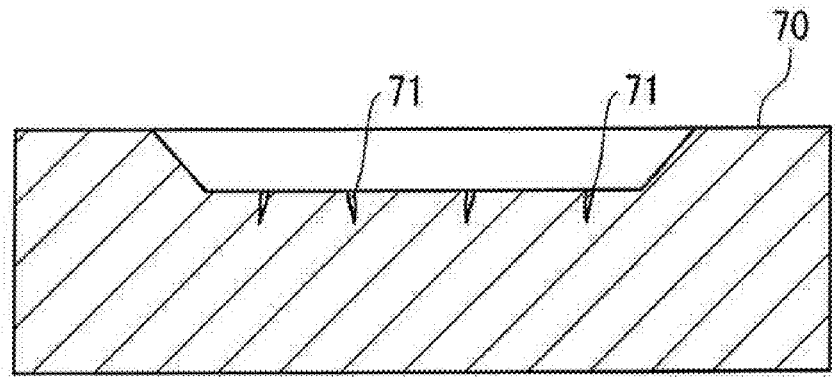
FIGS. 11A, 11B and 11C are views illustrating the method of repair disclosed in Patent Document 3.
Figure 11A:
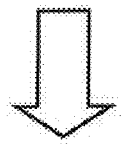
Figure 11B:
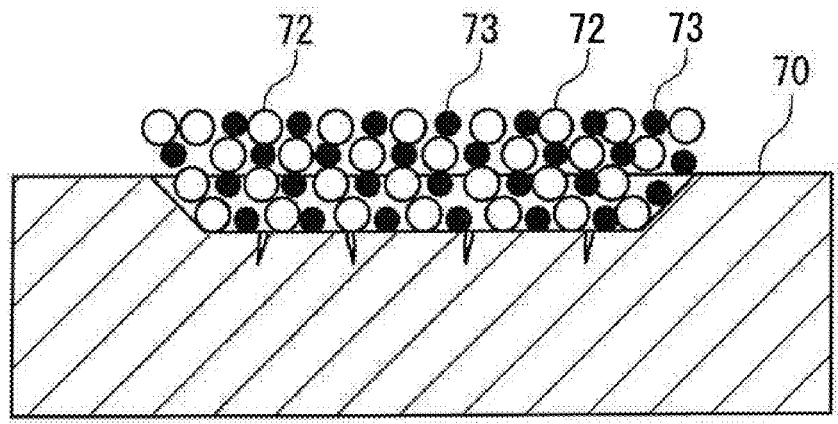
Figure 11B:
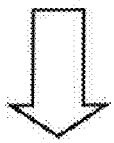
Figure 11C:
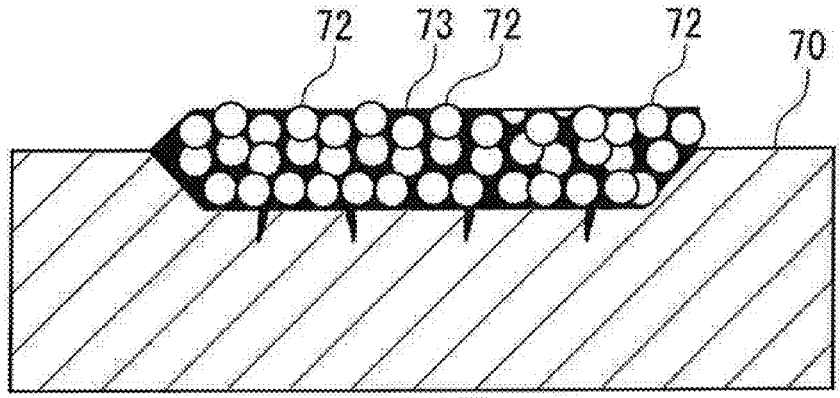
Figure 12:
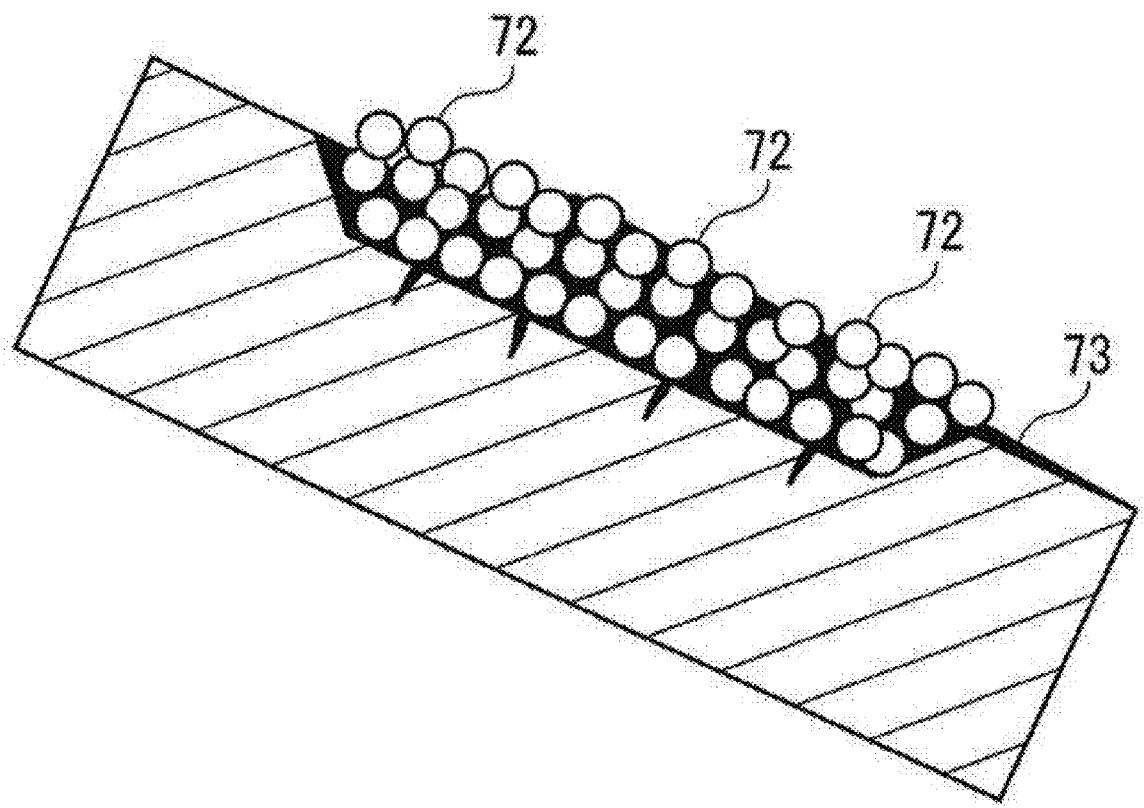
FIG. 12 is a view illustrating a state in which an inclined base is repaired by brazing.
Figure 13:
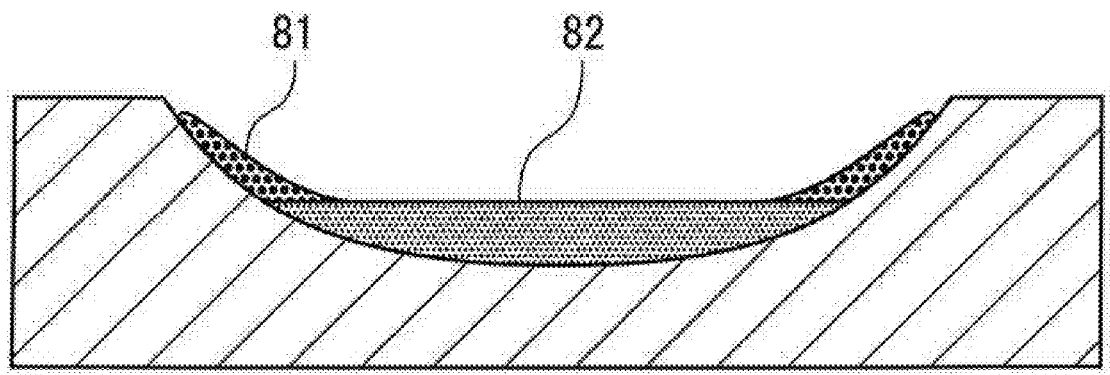
FIG. 13 is a view illustrating a state in which a curved surface of a base is repaired by brazing.

Next, with reference to FIG. 10, a sixth embodiment according to the present invention is described.

The sixth embodiment is also applied when a portion of a vane-shaped base 60 shown in FIG. 10A is remodeled into a different shape, or is repaired.

The portion above the broken line of the base 60 shown in FIG. 10A is removed by cutting.

In the portion removed by cutting, an exchange component 62 approximately the same in exterior shape as the portion removed by cutting is placed, as shown in FIG. 10B. In the exchange component 62, a groove 63 having a shape approximately similar to the periphery of the exchange component 62 is formed with a predetermined depth. In this groove 63, a brazing material 64 is filled. The exchange component 62 functions as a brazing material support and is made of the same porous metal material as shown in the first embodiment.

As shown in FIG. 10B, under the condition that the exchange component 62 with the brazing material 64 filled in the groove 63 is placed on the top surface of the base 60, heat treatment is conducted. The brazing material 64 filled in the groove 63 is melted by the heat treatment. The molten brazing material 64 penetrates into the pores formed in the exchange component 62 to be impregnated in the interior of the exchange component 62. A part of the brazing material 64 impregnated in the exchange component 62 penetrates into the interstice between the exchange component 62 and the base 60 to be filled therein. In this process, the brazing material 64, other than the brazing material 64 which has penetrated into the interstice between the exchange component 62 and the base 60 to be filled therein, is impregnated into the exchange component 62, and hence there is no possibility that the brazing material 64 flows out to the outside. The brazing material 64 contributes to the bonding between the exchange component 62 and the base 60.

After heating for a predetermined time, the heating inside the heating furnace is terminated and the temperature inside the furnace is decreased down to normal temperature. In the course of the temperature decrease, the exchange component 62 is strongly bonded to the base 60 through the brazing material 64. Additionally, the pores of the exchange component 62 made of a porous metal material are filled with the brazing material 64 to increase the mechanical strength of the exchange component 62 and the exchange component 62 functions as a portion of the base 60.

The invention claimed is:

1. A method of repair, said method comprising:
    brazing a repair portion of a base, wherein the repair portion needs to be repaired;
    placing a brazing material support in the interior of the base; and
    providing a brazing material in contact with the repair portion,
    wherein
    when the brazing material support is in contact with the repair portion, the brazing material is solidified,
    the brazing material support is a porous material having a three-dimensional network structure in which pores of the porous material are communicatively connected to each other,
    the brazing material support comprises at least one of metal wool, metal nonwoven fabric or metal gauze,
    the brazing material support is made of a material equivalent to the base, and
    heating the brazing material to a temperature at or above the melting point of the brazing material when the brazing material in a powder form is brought into contact with the brazing material support, so that the brazing material is melted.

2. The method of repair according to claim 1, further comprising heating the brazing material in a powder form to a temperature at or above the melting point of the brazing material after the brazing material support is brought into contact with the repair portion, so that the brazing material is melted by said heating.

3. The method of repair according to claim 1, wherein the porous material has flexibility.

4. The method of repair according to claim 1, wherein after the brazing material has been solidified, the brazing material support is left to constitute a portion of the base.

5. The method of repair according to claim 1, further comprising removing a removal portion of the base, and the brazing material support is placed at the portion of the base which portion has been subjected to the removal.

6. The method of repair according to claim 5, wherein the repair portion has a crack which is removed by removing the removal portion of the base.

7. The method of repair according to claim 5, wherein the molten brazing material is solidified when an exchange component to be exchanged with the removed portion of the base is brought into contact with the brazing material support, and thus, the base and the exchange component are bonded to each other through the brazing material support.

8. The method of repair according to claim 2, wherein the porous material has flexibility.

9. The method of repair according to claim 2, wherein after the brazing material has been solidified, the brazing material support is left to constitute a portion of the base.

10. The method of repair according to claim 2, further comprising removing a removal portion of the base, and the brazing material support is placed at the portion of the base which portion has been subjected to the removal.

11. The method of repair according to claim 10, wherein the repair portion has a crack which is removed by removing the removal portion of the base.

12. The method of repair according to claim 10, wherein the molten brazing material is solidified when an exchange component to be exchanged with the removed portion of the base is brought into contact with the brazing material support, and thus, the base and the exchange component are bonded to each other through the brazing material support.

* * * * *